No. 848,299. PATENTED MAR. 26, 1907.
C. FEID.
METHOD OF MAKING CHAINS.
APPLICATION FILED FEB. 27, 1906.
Fig. 1.
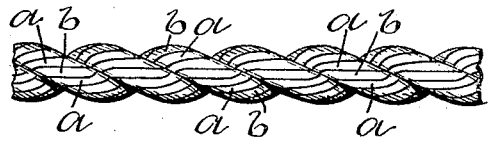
Fig. 2. Fig. 3.
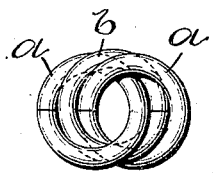 
Fig. 4. Fig. 5.
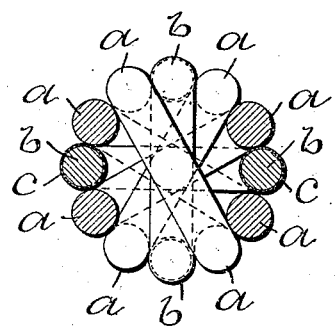 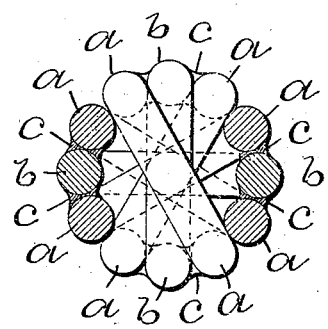
WITNESSES:
Chas. H. Luther Jr.
Ada E. Hagerty.
INVENTOR:
Charles Feid
by Joseph H. Miller
ATTORNEY.

UNITED STATES PATENT OFFICE.

CHARLES FEID, OF NORTH ATTLEBORO, MASSACHUSETTS.

METHOD OF MAKING CHAINS.

No. 848,299.  Specification of Letters Patent.  Patented March 26, 1907.

Application filed February 27, 1906. Serial No. 303,289.

*To all whom it may concern:*

Be it known that I, CHARLES FEID, a citizen of the United States, residing at North Attleboro, in the county of Bristol and State of Massachusetts, have invented a new and useful Improvement in Methods of Making Chains, of which the following is a specification.

This invention has reference to an improvement in method of making chains, and more particularly to rope chains.

The links of rope chains as heretofore constructed are secured together by soldering by hand every second link to the next adjoining link after the chain is formed. This manual method of soldering rope chains requires great skill and is extremely slow in operation, thereby increasing the cost of rope chains over other forms of chains; also, as the charge of solder in this method of soldering, particularly in small chains, is extremely minute, the soldering is often defective, thus requiring skilled inspection and resoldering of parts of the chain.

The object of my invention is to improve the construction of a rope chain by the use of my new method, whereby a more perfect rope chain is constructed than has heretofore been done.

A further object of my invention is to improve the method of soldering rope chains.

A still further object of my invention is to reduce the cost of manufacturing rope chains.

My invention consists in the peculiar and novel method of construction of a rope chain, as will be more fully set forth hereinafter and pointed out in the claim.

Figure 1 is a side view of a section of rope chain embodying my invention. Fig. 2 is an enlarged side view of three links, the center one of which is charged or covered with solder and illustrating the method of forming a rope chain. Fig. 3 is an edge view looking at the upper edge of Fig. 2. Fig. 4 is a greatly-enlarged sectional view taken transversely through the chain, showing every third link charged with solder and the condition of the chain before soldering; and Fig. 5 is a transverse sectional view similar to Fig. 4, showing the condition of the chain after soldering.

In the drawings, $a\ a$ indicates the uncharged links, $b\ b$ the links charged with solder, and $c\ c$ the solder on the charged links, as shown in Fig. 4, for securing the adjacent uncharged links $a\ a$ to the charged links $b\ b$ when fused, as shown in Fig. 5. The uncharged links $a\ a$ are formed of wire in the usual way, as shown in Fig. 2. The charged links are formed from a wire (preferably of the same metal as the uncharged links) which is completely covered with a thin film of soldier in any well-known way and fluxed with borax or other soldering fluid before forming the wire into the links. The chain is now formed up in the usual way of the links $a\ a$ and $b\ b$ in series of two uncharged links $a\ a$ and one charged link $b$, every third link being a charged link, as shown in Figs. 4 and 5. The completed chain is now subjected to a predetermined heat and the solder $c\ c$ fused between the links $a\ a$ and $b$, thus firmly securing the links of the chain together in series of three links, as shown in Fig. 5. In practice I find that in this form of soldering the solder when fused will run entirely off the outer surface of the links $b\ b$ and collect between the link $b$ and the links $a\ a$, thus exposing the metal on the outer surface of the links $b\ b$ and firmly securing the links $a\ a$ to the links $b\ b$, as shown in Fig. 5. Also by soldering three links together by my new method instead of two by hand, as was the practice heretofore, a very much stronger chain is constructed.

I do not wish to confine myself to a rope chain, as it is evident that intermediate links charged or covered with solder could be used in other forms or kinds of chains without materially affecting the spirit of my invention.

Having thus described my invention, I claim as new and desire to secure by Letters Patent—

The herein-described method of making chains consisting in interposing charged links between uncharged links, and then subjecting the chain to a predetermined heat which will fuse the charging of said charged link.

In testimony whereof I have signed my name to this specification in the presence of two subscribing witnesses.

CHARLES FEID.

Witnesses:
ADA E. HAGERTY,
J. A. MILLER.